UNITED STATES PATENT OFFICE.

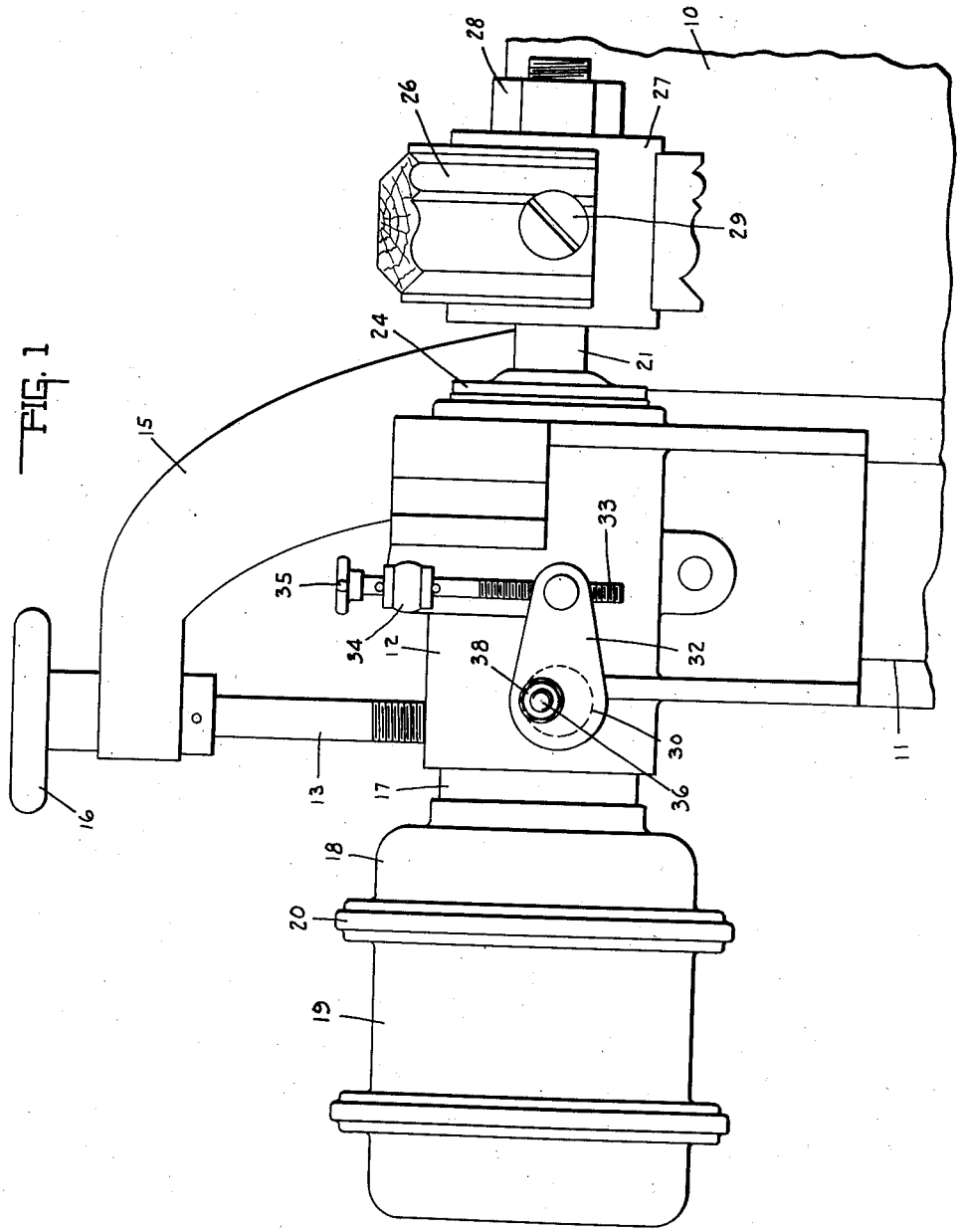

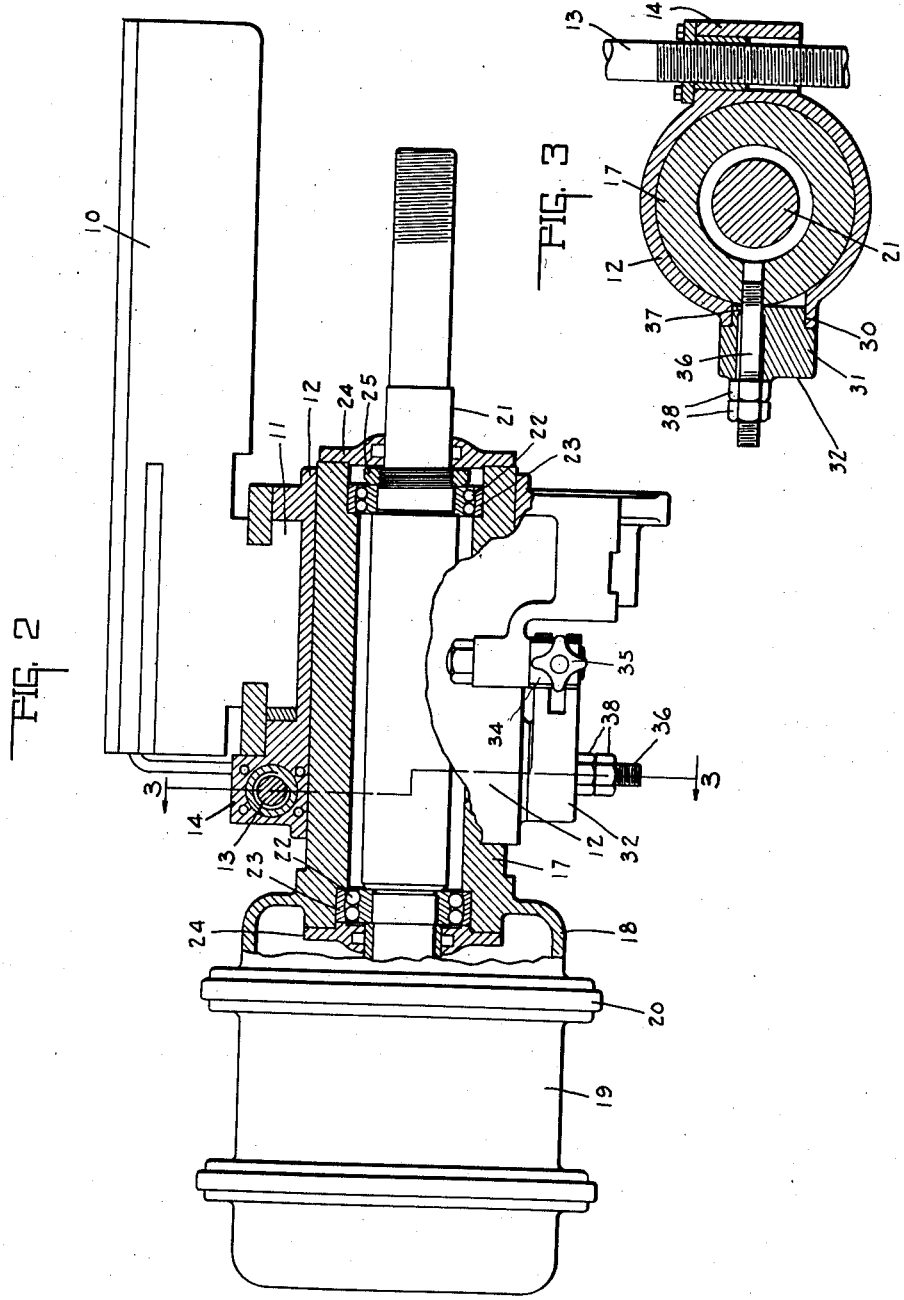

MONTE B. GATHMAN, OF SHELBYVILLE, AND ROBERT DAVY EAGLESFIELD, OF INDIANAPOLIS, INDIANA; SAID GATHMAN ASSIGNOR TO ANTON VONNEGUT, OF INDIANAPOLIS, INDIANA.

SPINDLE ADJUSTMENT FOR MOTOR-DRIVEN MOLDERS.

1,340,709. Specification of Letters Patent. Patented May 18, 1920.

Application filed December 15, 1919. Serial No. 345,080.

*To all whom it may concern:*

Be it known that we, MONTE B. GATHMAN and ROBERT DAVY EAGLESFIELD, citizens of the United States, and residents of Shelbyville and Indianapolis, respectively, counties of Shelby and Marion, respectively, and State of Indiana, have invented a certain new and useful Spindle Adjustment for Motor-Driven Molders; and we do hereby declare that the following is a full, clear, and exact description thereof, reference being had to the accompanying drawings, in which like numerals refer to like parts.

This invention relates to new and useful improvements in molding machines, and particularly to the adjustment of the spindle for motor driven molders or cutter heads.

Heretofore in applying individual motive power in the form of electric motors, to which cutter heads for engaging each side of the timber to be molded are attached, the longitudinal adjustment of the driving shaft or cutter spindle has been accomplished independently of the motor, or in other words necessitating the rotor irons of the motors to be adjusted with the shaft longitudinally of the stator irons of the motor. The construction permitting of the adjustment of the shafts has been difficult and expensive to manufacture, and it is the object of this invention to simplify the construction whereby a better form of adjustment may be had. This is accomplished by arranging the support and adjustment of the motor and shaft upon the frame of the machine so that the adjustment may be had of the entire construction.

For enabling a more complete understanding of the entire mechanism and machine, reference may be had to Patent No. 1,264,165, issued April 30, 1918, for molding machine, it being the object of this invention to improve upon the machine shown and described in said patent as relates to the spindle adjustment.

The full nature of the invention will be understood from the accompanying drawings and the following description and claims:—

Figure 1 is a side elevation of the motor and cutter head. Fig. 2 is a plan view looking down upon the motor and cutter head showing a portion thereof in lateral cross section. Fig. 3 is a section taken on the line 3—3 of Fig. 2.

In the drawings there is shown a portion of the frame 10 of a molding machine, such as is used for cutting surfaces of timber in any desired design, said machine being of the ordinary construction, having four cutter heads, each of the cutter heads to be operable independently of the others and in position to engage one of the four sides of the timber to be cut, independently driven by electric motors.

The frame 10 is provided with a vertically extending plate 11 upon which is slidably mounted a supporting sleeve or mounting 12 adapted to be vertically adjusted upon the frame by means of the screw 13 screwing into the block 14 rigidly secured thereto. The screw 13 is supported by the derrick like arm 15 and is manipulated by the hand wheel 16.

Mounted in the sleeve 12 so as to be slidable longitudinally thereof there is a motor head extension bearing 17 having one end thereof formed into a motor head 18 adapted to be rigidly secured to the motor housing 19 through the rib 20. The electric motor contained in the housing 19 is directly connected to the spindle 21 which extends through the bearing 17 and is revolubly mounted therein on the ball bearings 22 mounted in the ball races 23. At each end of the bearing 17 there are end caps 24 secured to the ends of said bearing, and a threaded lock nut 25 is provided at the end of said bearing so as to secure said spindle and retain the same in position.

The cutter knives 26 are adjustably secured to the cutting head 27 which is slidably mounted upon the shaft and secured by means of the lock nut 28 and set screw 29, in position to properly engage and cut the timber passed through the machine. The cutter heads and blocks may be mounted upon the shaft in approximately the exact position to properly engage the timber, and rigidly secure it, but in order to enable a finer adjustment and alinement of the cutter heads, longitudinal adjustment of the motor shaft or cutter spindle is obtained by sliding the entire construction longitudinally in the supporting sleeve 12.

The sleeve 12 is provided with a circular flanged opening 30 in the side thereof in which the circular head 31 of the arm 32 may pivot. The arm 32 extends laterally and is actuated by the set screw 33 passing through a bearing 34 in the side of the sleeve and provided with a hand wheel 35, whereby the turning of said hand wheel will cause the arm 32 to turn about the circular head 31 as a pivot.

Eccentrically disposed and extending through one side of the major portion of the arm 32 and the circular head 31 there is a bolt 36 adapted to freely turn therein, and screw into a tapped portion of the bearing 17. The screw 36 is of smaller diameter than the opening through which it passes, as shown in Fig. 3, so as to have some play therein and no bind, although a bearing 37 is provided near the inner surface of the circular disk 31. By means of this construction the movement of the arm 32 about its pivot head will cause the bolt 36 to move about an arc and adjust the lateral position of the bearing 17, motor housing and cutter head. The movement of the arm 32 will approximate about 30 degrees on each side of the central position, and will enable a fine lateral adjustment to be obtained. When the cutter head is properly positioned by this adjustment, the nuts 38 are turned and locked so as to draw the bearing 17 and the inner surface of the arm 32 together to prevent any lateral movement so that the vibration and jarring of the machine will not cause the cutter spindle to be moved from adjusted position.

The invention claimed is:—

1. A spindle attachment for motor driven molders including a motor head extension bearing having a motor mounted on one end thereof, through which said spindle extends, a mounting for supporting said bearing, and means for adjusting said bearing within said mounting for causing a fine adjustment of the spindle mounted therein.

2. A spindle adjustment for motor driven molders including a frame, a mounting adjustable on said frame, means for adjusting said mounting thereon an extension bearing supported by said mounting rigidly secured to the motor housing as a unit thereof, a motor driven cutter head spindle mounted in said bearing, and means for adjusting said bearing, motor housing and spindle as a single unit therein for obtaining the proper adjustment of said spindle and cutter head.

3. A spindle adjustment for motor driven molders including a frame, a mounting slidable upon said frame, means for adjusting said mounting thereon, a motor head extension bearing slidably mounted in said mounting, said bearing carrying a motor housing on one end thereof, a cutter head spindle mounted in said bearing adapted to be driven by said motor, and means on said mounting for engaging said bearing and controlling its longitudinal adjustment therein so as to adjust the position of said spindle and cutter head.

4. A spindle attachment for motor driven molders including a frame, a mounting adjustably supported on said frame, a motor driven cutter head spindle and motor housing carried by said mounting as a single unit, a cutter head on said spindle, and means for adjusting the position of said spindle and motor housing, whereby the proper adjustment of said cutter head may be obtained.

5. A spindle adjustment for motor driven molders including a frame, a mounting slidable upon said frame, a screw for adjusting the position thereof, a motor head extension bearing slidably mounted in said mounting, having a cutter spindle revolubly mounted therein, an adjusting arm mounted on the side of said mounting, and extending therethrough to said bearing, a screw for actuating and adjusting the position of said arm, a bolt eccentrically mounted in said arm and connected with said bearing whereby the movement of said arm will cause said bearing to slide longitudinally for adjusting said cutter head, and means on said bolt for clamping and locking said bearing in position for preventing its further movement.

In witness whereof we have hereunto affixed our signatures.

MONTE B. GATHMAN.
ROBERT DAVY EAGLESFIELD.